United States Patent
Kanehira et al.

(10) Patent No.: US 6,494,800 B1
(45) Date of Patent: Dec. 17, 2002

(54) WEAR-RESISTANT SILENT CHAIN

(75) Inventors: Makoto Kanehira; Hitoshi Ohara; Kazumasa Matsuno; Masao Maruyama; Hiroshi Horie; Yoshihiro Kusunoki; Shigekazu Fukuda; Takayuki Funamoto, all of Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/630,822

(22) Filed: Aug. 2, 2000

(30) Foreign Application Priority Data

Aug. 2, 1999 (JP) ............................................ 11-219325

(51) Int. Cl.[7] ............................................. F16G 13/04
(52) U.S. Cl. ........................................................ 474/215
(58) Field of Search ................................. 474/212, 213, 474/214, 215, 216, 229, 91; 59/5

(56) References Cited

U.S. PATENT DOCUMENTS

| | | | | |
|---|---|---|---|---|
| 1,558,719 A | * | 10/1925 | Sturtevant | 474/216 |
| 3,742,776 A | * | 7/1973 | Avramidis | 74/251 S |
| 4,130,026 A | * | 12/1978 | Jeffrey | 74/245 |
| 5,026,331 A | * | 6/1991 | Sugimoto et al. | 474/214 |
| 6,068,568 A | * | 5/2000 | Kozakura et al. | 474/212 |

* cited by examiner

*Primary Examiner*—David A. Bucci
*Assistant Examiner*—Timothy McAnulty
(74) *Attorney, Agent, or Firm*—Howson & Howson

(57) ABSTRACT

A wear-resistant silent chain includes a large number of link plates articulately connected together in an endless fashion by rocker joint pins each composed of a long pin and a short pin. The long and short pins have an outer peripheral surface formed by, at least, a convexly arcuate rocker surface which is adjacent to the convexly arcuate rocker surface of another pin, a load-bearing surface on the side opposite to the rocker surface and being seated on an inner peripheral surface of each of a pair of pin holes formed in each link plate, and a pair of lubricant guide surfaces each extending substantially linearly from one circumferential end of the load-bearing surface to an adjacent circumferential end of the rocker surface while extending divergently with respect to the inner peripheral surface of each of said pin holes. The lubricant guide surface provides a large lubricant collecting area which is sufficient to lubricate the load-bearing surface with an enough amount of lubricating oil and thereby prevents local wear caused between the inner peripheral surface of each pin hole and the load-bearing surface of each pin.

3 Claims, 5 Drawing Sheets

WEAR-RESISTANT SILENT CHAIN

BACKGROUND OF THE INVENTION

1. Field of the Invention

The present invention relates to a so-called "rocker joint type" silent chain which is particularly suitable for use, as an automobile silent chain, in a drive unit for an engine cam shaft, an engine auxiliary device, a transmission, a transfer box and so on of an automobile.

2. Description of the Related Art

As shown in FIGS. 4 and 5, a conventional rocker joint type silent chain A1 includes a large number of link plates A4 articulately connected together in an endless fashion by means of rocker joints each composed of a long pin A2 and a short pin A3 which is smaller in length than the long pin A2. The link plates A4 each have an inverted tooth-like engagement surface T designed for direct meshing engagement with teeth of a sprocket A5 so that power is transmitted between the sprocket and another sprocket (not shown).

The link plates A4 are arranged in many rows in the transverse direction of the silent chain A1 in such a manner that the plates A4, which are adjacent to each other back and forth in the traveling direction of the silent chain A1, are sandwiched alternately in the transverse direction.

As shown in FIG. 6, opposite ends of the long pin A2 are press fit in non-circular pin holes A9, A10 formed in two guide plates A6 which are arranged adjacent both outsides of plural, transversely arranged link plates A4 and are guided by side surfaces of the teeth of the sprocket A5.

The long pin A2 and the short pin A3, as shown in FIG. 6, have substantially the same cross-sectional shape and are inserted into each of a pair of pin holes A7 and A8 in each link plate A4 so as to be opposed to each other such that convexly arcuate rocker surfaces R of the long and short pins A2, A3, respectively, are adjacent to each other.

The long pin A2, inserted in each pin hole A7, A8 and located closer to an outer end of the link plate A4 than a center of the link plate A4, has a load-bearing surface C1 composed of a concavely arcuate portion formed on the side opposite to the rocker surface R and a pair of convexly arcuate portions extending contiguously from both circumferential ends of the concavely arcuate portion. The load-bearing surface C1 comes into engagement with a pin-seating surface S1 of each pin hole A7, A8 and is thereby prevented from rotating. The pin-seating surface S1 is composed of a convexly arcuate portion and a pair of concavely arcuate portions extending continuously from both circumferential ends of the convexly arcuate portion.

The short pin A3, inserted in each pin hole A7, A8 and located closer to the center of the link plate A4 than the outer end of the link plate A4, is engaged at a load-bearing surface C1 thereof with pin-seating surface S1 of a pin hole A9, A7 formed in a longitudinally adjacent link plate (not shown) and is thereby prevented from rotating.

FIG. 8 is an enlarged view of a portion of FIG. 7, showing the manner in which the rocker surface R and the load-bearing surface C1 are connected with each other. As shown in FIG. 8, the rocker surface R and the load-bearing surface C1 of each pin (long pin A2 being shown) are connected together by a pair of convexly arcuate connecting surfaces C2 having an extremely small radius of curvature, such as about one-twentieth of a chain pitch, such that each of the convexly arcuate connecting surfaces C2 produces no substantial gap or clearance between itself and the peripheral surface of each pin hole A7, A8.

When the silent chain A1 is entrained around on the sprocket A5, as shown in FIG. 4, and a tensile force is exerted between front and rear link plates A4, the rocker surfaces R, R of the long and short pins A2 and A3 are pressed against each other to effect transfer of the tensile force.

In this instance, the silent chain A1 is under oiled or lubricated condition so that a lubricating oil is supplied to the silent chain A1 from the outside thereof. Since the opposite rocker surfaces R, R are each formed in a convexly arcuate surface, it becomes possible to perform a relative rocking motion between the long and short pins A2 and A3, thus permitting bending between longitudinally adjacent link plates A4.

In the conventional silent chain A1 constructed as described above, the convexly arcuate pin-seating surface S1 of each pin hole A7, A8 of the link plate A4 and the concavely arcuate load-bearing surface C1 of the long pin A2 which is closer to the outside of the link plate A4 are brought into engagement with each other to effect transfer of the tensile force or load while preventing rotation of the long and short pins A2 and A3 relative to the link plate A4.

However, the rocker surface R and the load-bearing surface C1 of each pin A2, A3 are connected together via the edge-like convexly arcuate connecting surfaces C2 having an extremely small radius of curvature not producing a substantial clearance between themselves and the inner peripheral surface of the corresponding pin hole A7, A8. As a result, it is difficult for the lubricating oil supplied from the outside of the silent chain A1 to enter between the load-bearing surfaces C1, C1 of the pins A2, A3 and the inner peripheral surface of each pin hole A7, A8. Accordingly, if the pins A2, A3 and pin holes A7, A8 have different manufacturing accuracies, abnormal wear such as local wear is likely to occur due to insufficient lubrication. This abnormal wear has a great influence on the reduction of wear of the silent chain as a whole.

In addition, when the long pins A2 are press fit into the non-circular pin holes A9, A10 of the link plates A4 to assemble a silent chain, the convexly arcuate connecting surfaces C2 of each long pin A2 are susceptible to stress concentration. When a tensile load is exerted between adjacent link plates A4 during use of the silent chain A1, the silent chain A1 as a whole is likely to cause fatigue failure due to stress concentrated on the convexly arcuate connecting surfaces C2. The fatigue failure becomes remarkable as the degree of interference between the long pins A2, A3 and the pin holes A9, A10 during press-fitting operation is enlarged to increase the joint strength between the guide plates A6 and the long pins A2 .

SUMMARY OF THE INVENTION

With the foregoing drawbacks of the prior art in view, it is an object of the present invention to provide a wear-resistant silent chain which is capable of permitting entry of a sufficient amount of lubricating oil between load-bearing surfaces of two rocker joint pins seated on an inner peripheral surface of each of a pair of pin hole in each link plate, thereby eliminating local wear which would otherwise occur between the rocker joint pins and the inner peripheral surface of each pin hole.

Another object of the present invention is to provide a wear-resistant silent chain which is capable of improving the fatigue strength of the chain by eliminating stress concentration which may occur at connecting portions between a load-bearing surface and a rocker surface of each rocker pin when a longer one of the rocker pins is press fit at each end into a pin hole in each guide plate and when the silent chain is loaded during power transmitting operation.

To achieve the foregoing objects, there is provided according to the present invention a wear-resistant silent chain including a multitude of link plates articulately connected together by a plurality of rocker joint pins, wherein each of the link plates has a pair of pin holes formed therethrough in symmetrical relationship with respect to a center of the link plate, and each of the rocker joint pins is composed of a long pin and a short pin which is smaller in length than the long pin, the long and short pins being inserted into each of the pair of pin holes in each link plate so as to be opposed to each other in such a manner that the long pin is closer to an outer end of the plate than the center of the plate, and the short pin is closer to the center of the plate than the outer end of the plate. Each of the long and short pins has an outer peripheral surface formed by, at least, a convexly arcuate rocker surface which is adjacent to the convexly arcuate rocker surface of another pin, a load-bearing surface on the side opposite to the rocker surface and being seated on an inner peripheral surface of each of the pin holes of the link plate, and a pair of lubricant guide surfaces, each lubricant guide surface extending substantially linearly from one of opposite circumferential ends of the load-bearing surface toward an adjacent one of opposite circumferential ends of the rocker surface while extending divergently with respect to the inner peripheral surface of each of the pin holes.

The terms "lubricant guide surface extending substantially linearly" used herein is intended to refer to not only a flat lubricant guide surface of a rectilinear profile but also a curved lubricant guide surface of a nearly straight curvilinear profile.

The wear-resistant silent chain may further includes guide plates each having a pair of pin holes each of which is defined by an inner peripheral surface substantially the same in profile as the outer peripheral surface of the long pin. Each end of the long pin is press fit in each of the pair of pin holes in each guide plate. The lubricant guide surfaces can, therefore, be connected to both circumferential ends of the rocker surface and both circumferential ends of the load-bearing surface via smoothly curved arcs.

The terms "an inner peripheral surface substantially the same as the inner peripheral surface of the long pin" mean that the inner peripheral surface has a shape which is similar to the shape of the outer peripheral surface of the long pin but is a size smaller than the size of the outer peripheral surface in view of the press-fitting engagement between the pin hole and the long pin.

It is preferable that the inner peripheral surface of each of the pin holes in the link be subjected to shaving to improve the surface roughness of the inner peripheral surface. Owing to the improved surface roughness, the shaved inner peripheral wall of the pin hole is able to create a smooth and large lubricant flow region which ensures smooth feeding of a lubricating oil onto the load-bearing surface of the pin seated on the inner peripheral surface of each pin hole. With this lubrication, the load-bearing pin surface and the inner peripheral pin hole surface are protected against local wear.

Preferably, the inner peripheral surface of each pin hole in the link plate and each of the lubricant guide surfaces of each of the long and short pins define therebetween a substantially triangular lubricant collecting space for collecting and holding a lubricating oil therein. The triangular lubricant collecting space converges toward the load-bearing surface of the pin so that when the silent chain is traveling around the sprocket, a sufficient amount of lubricating oil is introduced between the inner peripheral surface of the pin hole and the load-bearing surface of the pin due to an inertial force acting on the lubricating oil.

BRIEF DESCRIPTION OF THE DRAWINGS

A preferred embodiment of the present invention will now be described in detail, by way of example only, with reference to the accompanying drawings, in which.

DETAILED DESCRIPTION OF THE PREFERRED EMBODIMENT

The following description is merely exemplary in nature and is in no way intended to limit the invention or its application or uses.

Figure 1:
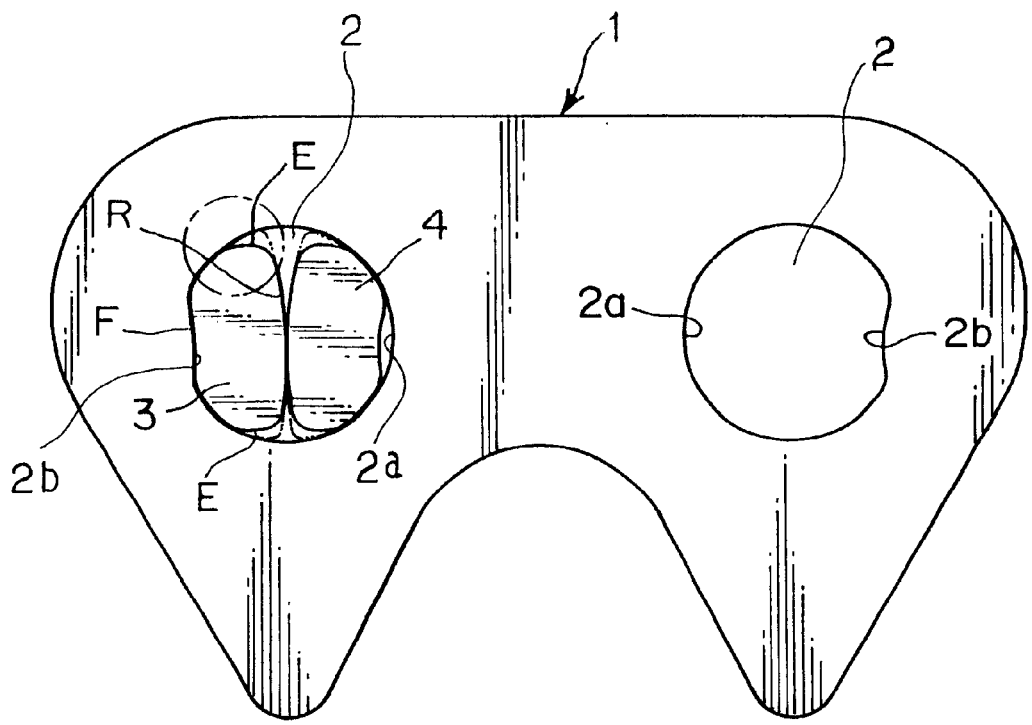
FIG. 1 is a view showing a pair of rocker joint pins inserted into a pin hole in a link plate of a silent chain according to an embodiment of the present invention.
Figure 4:
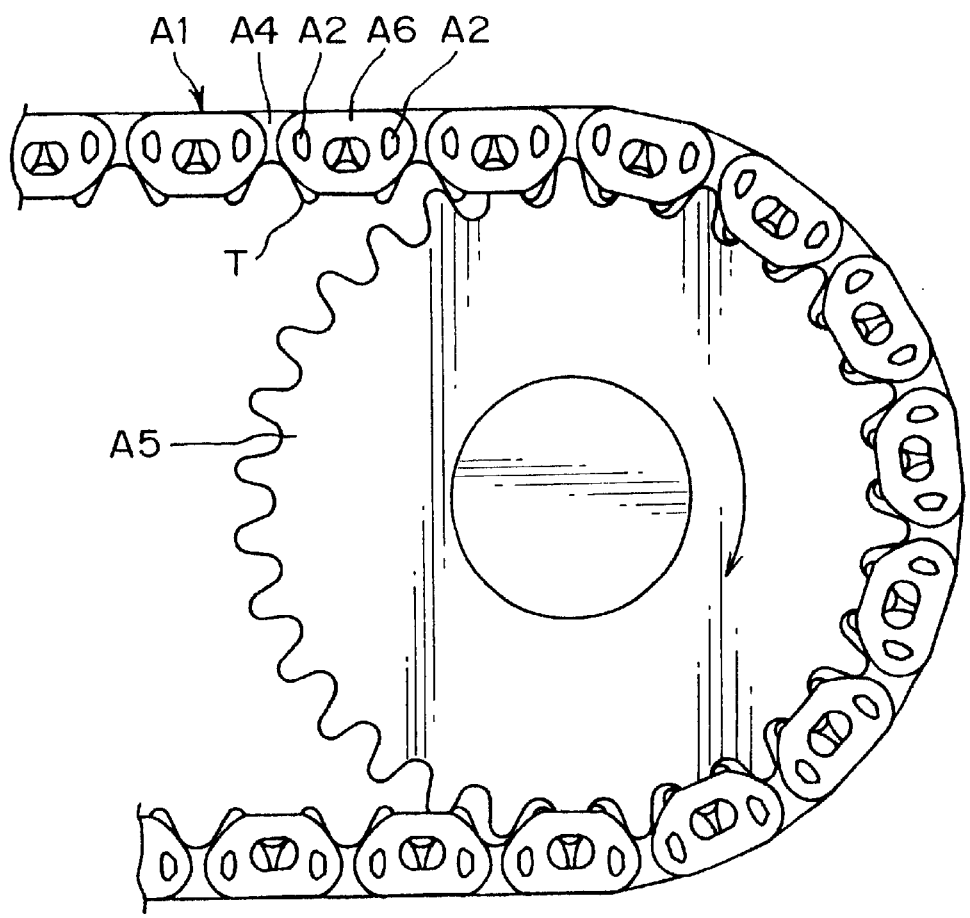
FIG. 4 is a fragmentary side view of a conventional silent chain.
Figure 5:
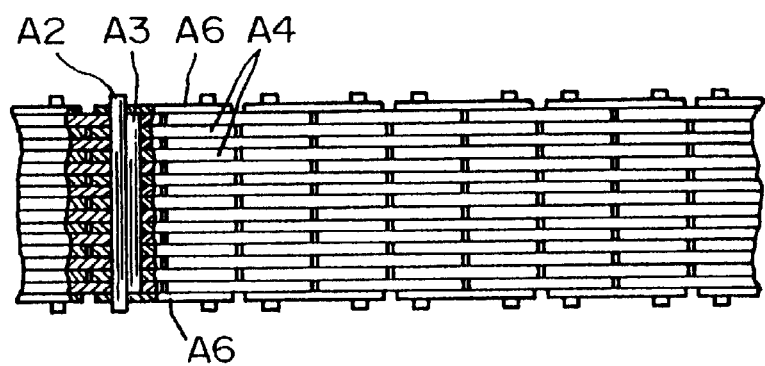
FIG. 5 is a fragmentary plan view, with parts cut away for clarity, of the conventional silent chain.

Referring now to the drawings and FIG. 1 in particular, there is shown a link plate 1 constituting part of a wear-resistant silent chain according to an embodiment of the present invention. Though not shown but as in the conventional silent chain A1 described above with reference to FIGS. 4 and 5, a large number of such link plates 1 are articulately connected together in an endless fashion by means of rocker joints each composed of a pair of pins 3, 4, so as to form a silent chain. The link plates 1 are arranged in may rows in the transverse direction of the silent chain in such a manner that the plates 1, which are adjacent each other back and forth in the traveling direction of the silent chain, are sandwiched alternately in the transverse direction.

The inner plate 1 has a toothed engagement surface (not designated) profiled such that at the onset of meshing engagement between the silent chain and a toothed sprocket, each tooth (not designated) of the toothed engagement surface comes into contact with one of teeth of the sprocket first at an inside flank (not designated) thereof. The thus profiled toothed engagement surface is called "inside flank contact type" toothed engagement surface. The link plate 1 may alternatively have a so-called "outside flank contact type" toothed engagement surface which, when the silent chain comes into meshing engagement with the sprocket, an outside flank of each tooth of the toothed engagement surface is first brought into contact with a tooth of the sprocket. However, the inside flank contact type engagement surface is superior to the outside flank contact type engagement surface in terms of the noise suppressing effect.

The link plate 1 has a pair of pin holes 2, 2 formed therethrough in symmetrical relationship with respect to a center of the link plate 1. The pin holes 2 each have an inner peripheral surface including a simple circular profile portion 2a which is closer to the center of the link plate 1 than to an outer end of the link plate 1, and a convexly arcuate portion 2b which is closer to the outer end of the link plate 1 than to the center of the link plate 1 and projects toward the center of the link plate 1. The inner peripheral surfaces of the pin holes 2 have been subjected to shaving to improve the surface roughness of the inner peripheral surface.

The pair of rocker joint pins 3 and 4 inserted into each of the pin holes 2 so as to be opposed to each other are composed of a long pin 2 and a short pin 3 which is smaller in length than the long pin 2. The long pin 3 is located closer to an outer end of the link plate 1 than to the center of the link plate 1, while the short pin 4 is located closer to the center of the link plate 1 than to the outer end of the link plate 1.

The long pin 3 and the short pin 4 have substantially the same cross-sectional shape. The outer peripheral surface of each pin 3, 4 has a convexly arcuate rocker surface R which is adjacent to the convexly arcuate rocker surface of another pin 4, 3. The outer peripheral pin surface further includes a load-bearing surface F on the side opposite to the rocker surface R, the load-bearing surface F being seated on the inner peripheral surface of each pin hole 2 of the link plate 1. The load-bearing surface F is composed of a concavely arcuate central portion facing the convexly arcuate portion 2b of the pin hole 2, and a pair of convexly arcuate portions contiguous to both circumferential ends of the central portion.

Figure 2:
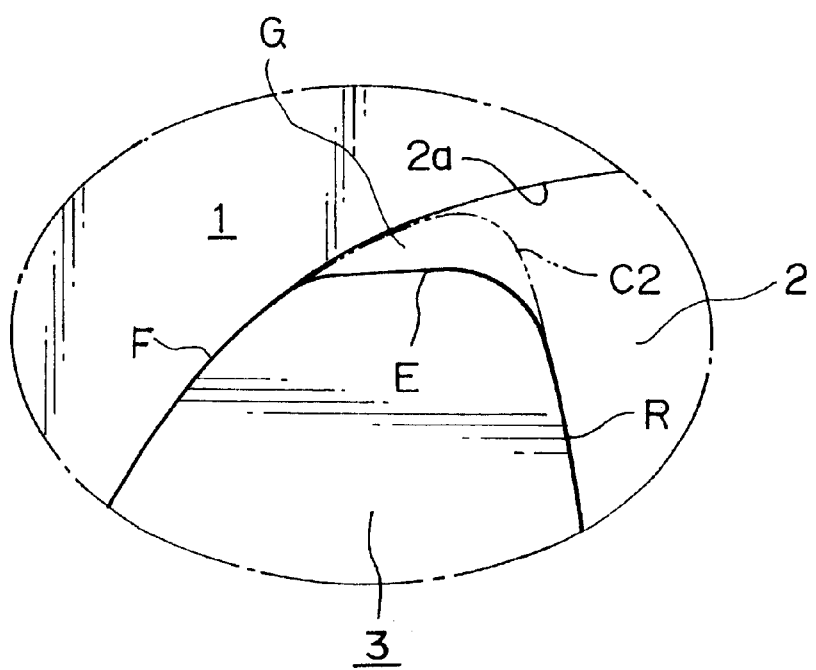
FIG. 2 is an enlarged view of a portion of FIG. 1.
Figure 8:
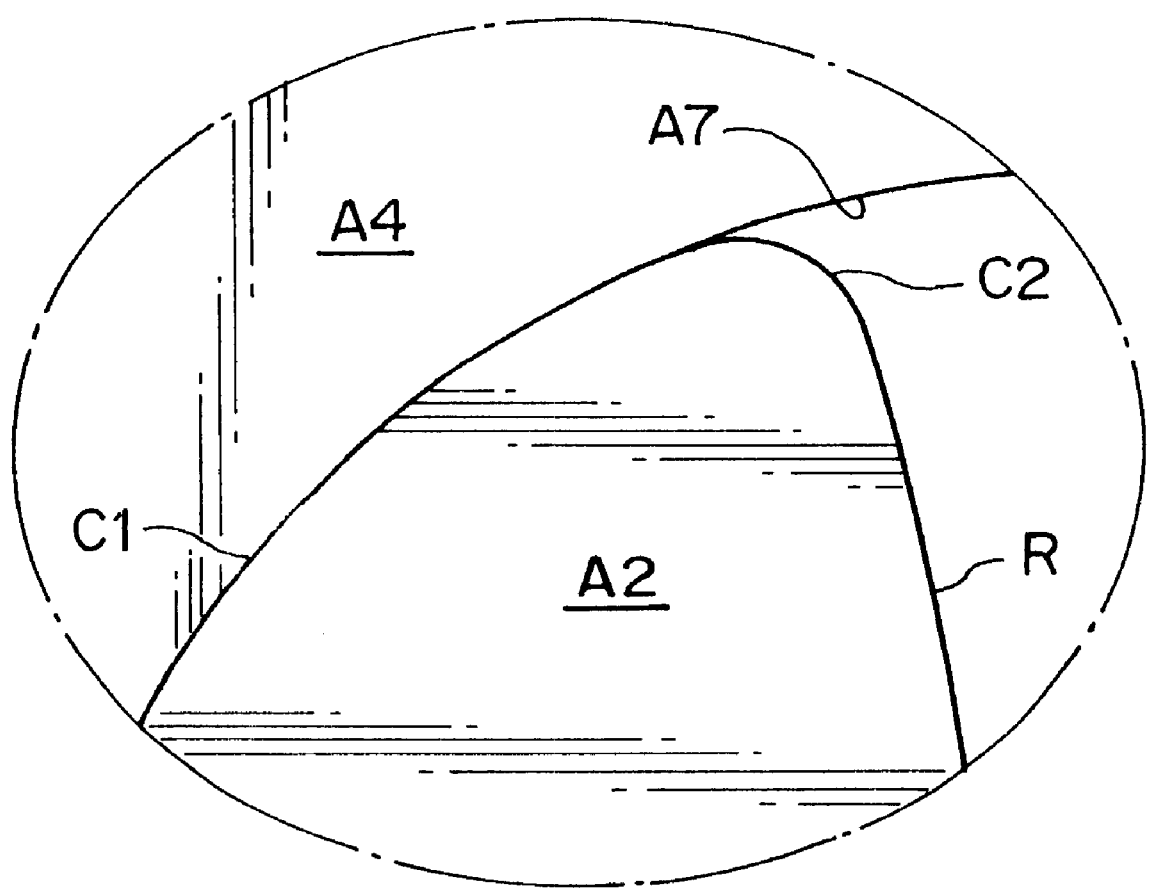
FIG. 8 is an enlarged view showing a portion of FIG. 7.

As best shown in FIG. 2 on enlarged scale, that portion of the outer peripheral surface of each pin (long pin 3 being shown), which interconnects one circumferential end of the load-bearing surface F and an adjacent circumferential end of the rocker surface R, includes a lubricant guide surfaces E extending substantially linearly from the circumferential end of the load-bearing surface F toward the adjacent circumferential end of the rocker surface R while extending divergently with respect to the inner peripheral surface (circular profile portion 2a) of the pin hole 2. In FIG. 2, the convexly arcuate connecting surface C2 of the conventional long pin A2 described above with reference to FIG. 8 is illustrated by phantom line for comparative purposes.

The lubricant guide surface E may be a flat surface having a rectilinear profile or a curved surface having a nearly straight curvilinear profile. The lubricant guide surface E of the pin 3, 4 and the circular profile portion 2a of the inner peripheral surface of the pin hole 2 jointly form a substantially wedge-like or triangular lubricant collecting space G for collecting and holding therein a lubricating oil which is supplied to the silent chain from the outside of the chain. The triangular lubricant collecting space G converges toward the load-bearing surface F. Both circumferential ends of the lubricant guide surface E are connected via smooth arcs to adjacent circumferential ends of the rocker and load-bearing surfaces R and E.

Thus, the respective outer peripheral surfaces of the long and short pins 3 and 4 are essentially formed by four consecutive surfaces, i.e., the rocker surface R, one of the pair of lubricant guide surfaces E, the load-bearing surface F and the other lubricant guide surface E. According to the illustrated embodiment, the rocker surface R of each pin 3, 4 has a radius of curvature of 5.0 mm whose proportion to a chain of 9.525 mm is 0.525, and the distance between the pair of lubricant guide surfaces E, E (which is equal to the width in the direction of a major axis of the cross section of the pin 3, 4 is 3.50 mm.

Figure 3:
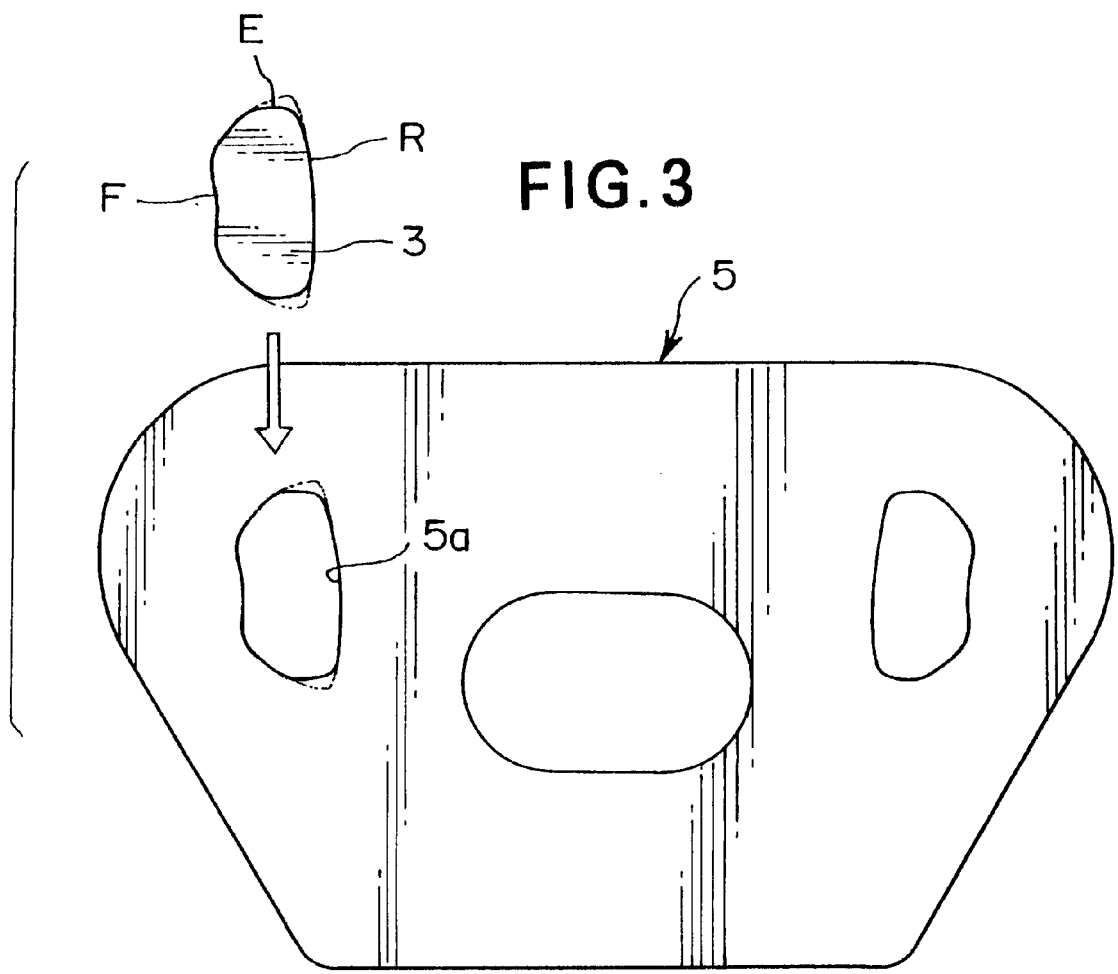
FIG. 3 is a view illustrative of the manner in which a longer one of the rocker joint pins is press fit in a pin hole in a guide plate.

As shown in FIG. 3, opposite ends of the long pin 3 are press fit into non-circular pin holes 5a formed in two guide plates 5 (one being shown) which are arranged adjacent both outsides of plural, transversely arranged link plates 1. The pin hole 5a has an inner peripheral surface substantially the same in profile as the outer peripheral surface of the long pin 3.

Figure 6:
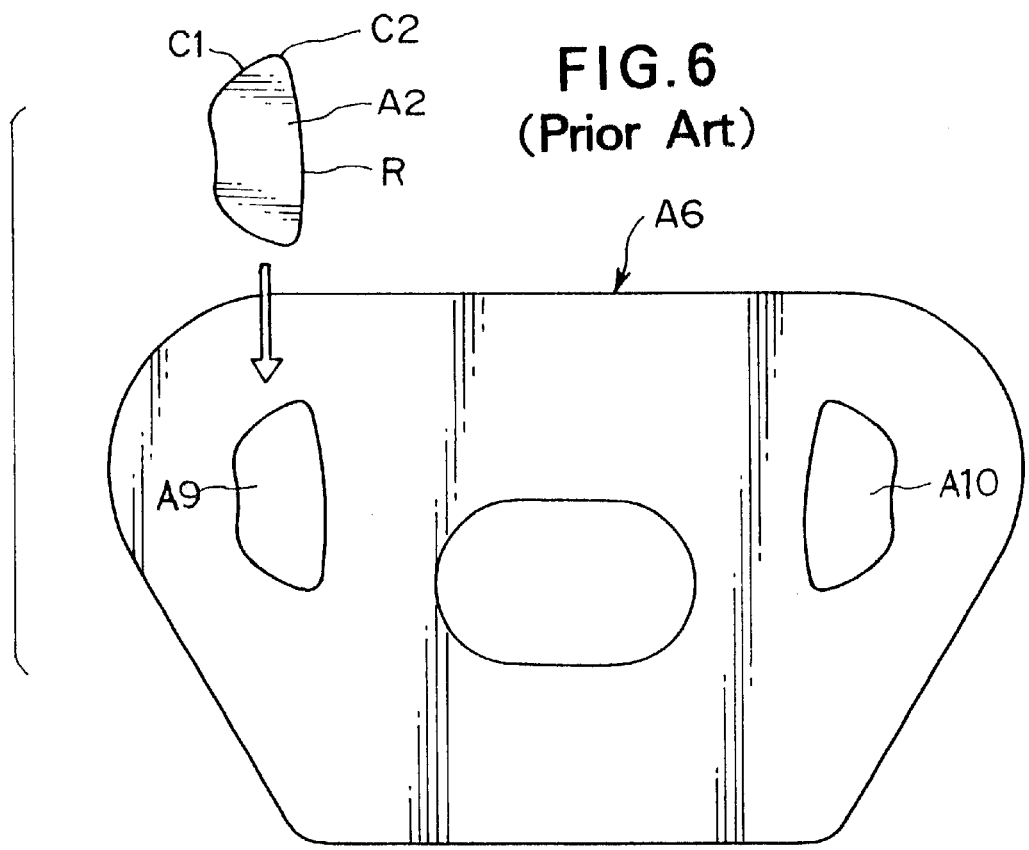
FIG. 6 is a view illustrative of the manner in which a long pin of the conventional silent chain is pressfit in a hole in a guide plate.
Figure 7:
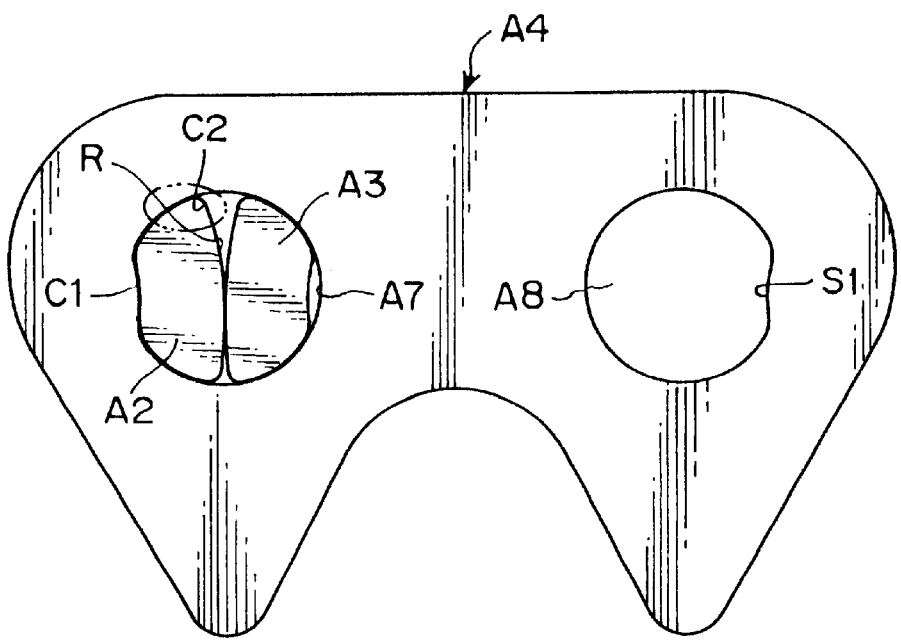
FIG. 7 is view showing a pair of rocker joint pins of the conventional silent chain inserted in opposed relation into a pin hole in a link plate.

The inner peripheral surface of the pin hole 5a has a shape which is similar to the shape of the outer peripheral surface of the long pin 3 formed essentially by four consecutive surfaces as described previously, but is a size smaller than the size of the outer peripheral surface of the long pin 3 so as to ensure press-fitting engagement between the pin hole 5a and the long pin 3. In FIG. 3, phantom lines illustrate a profile of the conventional long pin A2 (FIG. 6) for comparative purposes.

When the silent chain is entrained around two spaced sprockets (not shown) and a tensile force or load is exerted between two longitudinally adjacent link plates 1, the rocker surfaces R, R of the pair of long and short pins 3 and 4 are pressed against each other to effect transfer of the tensile force.

In this instance, the load-bearing surface F of each pin 3, 4, which is formed on the side opposite to the rocker surface R, comes into mutual engagement with the inner peripheral surface including the convexly arcuate portion 2b (FIG. 1) of each pin hole 2 and is thereby prevented from rotating relative to the link plate 1.

When the silent chain travels along the periphery of each sprocket, the convexly arcuate surfaces R, R of the long and short pins 3, 4 perform a relative rocking motion between the long pin 3 and the short pin 4, thus permitting bending between longitudinally adjacent link plates 1.

The silent chain is lubricated or oiled with a lubricating oil supplied from the outside of the silent chain in the same manner as the conventional silent chain. Since the outer peripheral surface of each of the long and short pins 3, 4 includes a pair of lubricant guide surfaces E extending substantially linearly from both circumferential ends of the load-bearing surface F toward both circumferential ends of the rocker surface R while extending divergently with respect to the inner peripheral surface (circular profile portion 2a, in particular) of the pin hole 2, it becomes possible to provide a large lubricant collecting space E defined between each of the lubricant guide surfaces E and the inner peripheral surface of the pin hole 2 for holding therein the lubricating oil used for lubrication of the load-bearing surface F.

In addition, since the linearly extending lubricant guide surfaces are arranged substantially parallel to the direction of travel of the silent chain, the flowability of the lubricating oil can be increased by an inertial force acting on the lubricating oil held inside the lubricant collecting space G during operation of the silent chain. The increased flowability of the lubricating oil is further enhanced by the inner peripheral surfaces of the pin holes 2 which have been subjected to shaving and hence have a high degree of surface roughness. Furthermore, since the lubricant collecting space G has a wedge-like or triangular shape converging toward the load-bearing surface F of the pin 3, 4, the lubricating oil is positively introduced between the inner peripheral surface of the pin hole 2 and the load-bearing surface F of the pin 3, 4. Thus, the load-bearing surface F can be lubricated with a sufficient amount of lubricating oil with the result that the local wear which may occur between the inner peripheral surface of each pin hole 2 and the load-bearing surface F of each pin 3, 4 can be diminished.

In addition, each of the pair of pin holes 5*a* formed in each guide plate 5 for press-fitting engagement with each end of the long pin 3 is identical in profile to the outer peripheral surface of the long pin 3. Accordingly, when the long pin 3 is press fit into the pin hole 5*a* during the assembly of the silent chain, a pressure or force acting on an end of the long pin 3 during a press-fitting operation is distributed uniformly over the entire area of the outer peripheral surface of the long pin 3. The long pin 3 can, therefore, be neatly press fit into the guide plate 5 without causing strain or deformation. By thus press-fitting long pin 3, the lubricant guide surface E and rocker surface R of the long pin 8 are prevented from causing fatigue failure during use of the silent chain. The silent chain as a whole has a high fatigue strength.

Obviously, various minor changes and modifications of the present invention are possible in the light of the above teaching. It is therefore to be understood that within the scope of the appended claims, the present invention may be practiced otherwise than as specifically described.

What is claimed is:

1. A wear-resistant silent chain including a multitude of link plates articulately connected together along a direction of travel by a plurality of rocker joint pins, wherein each of said link plates has a pair of pin holes formed therethrough in symmetrical relationship with respect to a center of said link plate, and each of said rocker joint pins is composed of a long pin and a snort pin which is smaller in length than said long pin, said long and short pins being inserted into each of said pair of pin holes in each link plate so as to be opposed to each other in such a manner that one of said long and short pins is closer to an outer end of said plate than to the center of said plate, and the other of said long and short pins is closer to the center of said plate than to the outer end of said plate, wherein the improvement comprises a structure in which each of the opposed long and short pins of each said rocker joint pins has:

an outer peripheral surface formed by, at least, a convexly arcuate rocker surface which is adjacent to the convexly arcuate rocker surface of another pin, a load-bearing surface on the side opposite to said rocker surface each said load-bearing surface being seated on an inner peripheral surface of one of the pin holes of one of said link plates, and a pair of lubricant guide surfaces, each lubricant guide surface extending substantially linearly, and substantially parallel to said direction of travel, from one of opposite circumferential ends of said load-bearing surface, substantially at a location at which the load-bearing surface is seated on an inner peripheral surface of one of said pin holes in which the pin is located, toward an adjacent one circumferential end of said rocker surface while directly opposing and extending divergently from said inner peripheral surface of said one of said pin holes.

2. A wear-resistant silent chain according to claim 1, wherein further including guide plates each having a pair of pin holes each of which is defined by an inner peripheral surface substantially the same in profile as said outer peripheral surface of said long pin, and wherein each end of said long pins is press fit in each of said pair of pin holes in each guide plate.

3. A wear-resistant silent chain according to claim 1, wherein said inner peripheral surface of each pin hole in each said link plate and each of said lubricant guide surfaces of each of said long and short pins define therebetween a substantially triangular lubricant collecting space for collecting and holding a lubricating oil therein.

\* \* \* \* \*